US006849184B1

(12) United States Patent
Lampi et al.

(10) Patent No.: US 6,849,184 B1
(45) Date of Patent: Feb. 1, 2005

(54) FORWARD OSMOSIS PRESSURIZED DEVICE AND PROCESS FOR GENERATING POTABLE WATER

(75) Inventors: Keith Lampi, Corvallis, OR (US); Edward Beaudry, Corvallis, OR (US); Jack Herron, Corvallis, OR (US)

(73) Assignee: Hydration Technologies Inc., Albany, OR (US)

( * ) Notice: Subject to any disclaimer, the term of this patent is extended or adjusted under 35 U.S.C. 154(b) by 172 days.

(21) Appl. No.: 10/317,468

(22) Filed: Dec. 11, 2002

Related U.S. Application Data

(60) Provisional application No. 60/340,392, filed on Dec. 12, 2001.

(51) Int. Cl.[7] ............................. B01D 61/00; C02F 1/44
(52) U.S. Cl. .................. 210/649; 210/652; 210/321.81; 210/321.85; 210/321.72
(58) Field of Search ................................ 210/649–652, 210/321.6, 321.72, 321.74, 321.75, 321.76, 321.81, 321.83, 321.84, 321.85; 290/43, 54; 60/649, 398

(56) References Cited

U.S. PATENT DOCUMENTS

| | | | | |
|---|---|---|---|---|
| 3,617,547 A | * | 11/1971 | Halff et al. | 210/638 |
| 3,670,897 A | * | 6/1972 | Frank | 210/321.6 |
| 6,185,940 B1 | * | 2/2001 | Prueitt | 60/649 |
| 6,391,205 B1 | * | 5/2002 | McGinnis | 210/644 |

* cited by examiner

Primary Examiner—W. L. Walker
Assistant Examiner—K S Menon
(74) Attorney, Agent, or Firm—Jeffrey B. Oster

(57) ABSTRACT

There is disclosed a process and device for Forward Osmosis (FO) Pressurized Device (FOPD) in general and one hydraulically coupled to a reverse osmosis (RO device for a FOPRO (Forward Osmosis Pressurized Reverse Osmosis). Specifically, there is disclosed a passive device (that is, not needed energy input) for using forward osmosis to generate significant hydraulic pressure that can be used to drive a reverse osmosis process, wherein the reverse osmosis process (not needed external energy to run pumps) can separate salt from salt water to generate potable water from water with high salt content (such as sea water, urine, sweat, brackish water and the like).

12 Claims, 4 Drawing Sheets

FORWARD OSMOSIS PRESSURIZED DEVICE AND PROCESS FOR GENERATING POTABLE WATER

CROSS REFERENCE TO RELATED APPLICATION

This patent application claims priority from U.S. Provisional Patent Application 60/340,392 filed 12 Dec. 2001.

TECHNICAL FIELD OF THE INVENTION

The present invention provides a process and device for Forward Osmosis (FO) Pressurized Device (FOPD) in general and one hydraulically coupled to a reverse osmosis (RO device for a FOPRO (Forward Osmosis Pressurized Reverse Osmosis). Specifically, the present invention provides a passive device (that is, not needed energy input) for using forward osmosis to generate significant hydraulic pressure that can be used to drive a reverse osmosis process, wherein the reverse osmosis process (not needed external energy to run pumps) can separate salt from salt water to generate potable water from water with high salt content (such as sea water, urine, sweat, brackish water and the like).

BACKGROUND OF THE INVENTION

Systems for generating drinkable or potable water from sea water, or other high salt content water sources, have generally not been cost-effective due to high energy costs and due to the frequent need to clean various desalination devices. One commonly-used method that is often employed by ships (large and small) is a reverse osmosis (RO) process to generate potable water from sea water. However, RO requires a pressure of between 600 and 1000 psi and such pressures can only be achieved by large energy-consuming pumping systems. Lower RO pressures can be used to save energy costs but only at the expense of much lower recovery rates.

FO or forward osmosis processes have been developed for a saline-free drink. However, the osmotic potential of the FO permeate or such product is generally not suitable for drinking or human rehydration. However, FO does have an advantage on not needed outside application of energy to drive its process as energy comes from an osmotic force. However, FO, by itself, cannot achieve potable water from a salt water source (e.g., sea water).

Therefore, neither FO nor RO alone has achieved the desirable criteria of producing drinking water from sea water without the need for significant quantities of energy input. The present invention addresses the problem of producing drinking water from a high saline water source (such as sea water, brackish water, urine or sweat) without the need to consume significant energy resources.

SUMMARY OF THE INVENTION

The present invention provides a device for desalinating water to produce drinking water, comprising:
(a) a closed housing assembly having a FO end and a RO end, a sealable osmotic agent access port communicating with the FO end of the housing assembly, a salt water inlet port and a water outlet port;
(b) a forward osmosis membrane element contained within the housing assembly at the FO end, wherein a central hollowed element communicates with the water outlet port;
(c) a reverse osmosis membrane element having a central hollowed element communicating with the water outlet port, and
(d) a movable piston or baffle assembly located between the FO end and the RO end of the housing assembly, whereby the piston or baffle acts to transmit hydraulic pressure generated by the FO element.

Preferably, the housing assembly is cylindrical. Preferably, the forward osmosis membrane element is either in a plate and frame configuration or in a spiral wound configuration. Preferably, the reverse osmosis membrane element is in a spiral wound configuration. Preferably, the FO element membrane is a membrane selected from the group consisting of a thin film composite RO membrane, a cellulose ester membrane, and an asymmetric cellulose ester membrane having a porous woven or non-woven support backing. Most preferably, the asymmetric cellulose ester membrane is backed with a woven or non-woven nylon or polyester or polypropylene fabric material.

The present invention further provides a process to produce potable water from a salt water source, comprising:
(a) providing a device for desalinating salt water to produce potable water comprising:
  (i) a housing assembly having a FO end and a RO end, a sealabe osmotic agent access port communicating with the PO end of the housing assembly, a salt water inlet port and a water outlet port;
  (ii) a forward osmosis assembly contained within the housing assembly at the FO end, wherein the forward osmosis assembly further comprises a central hollowed unit wherein the hollow communicates with the salt water inlet port;
  (iii) a reverse osmosis element having a central hollow device assembly, wherein the hollow chamber communicates with the water outlet port; and
  (iv) a piston or baffle assembly located between the forward osmosis assembly and the reverse osmosis element within the housing assembly and movable between the FO end and the RO end of the housing assembly;
(b) adding osmotic agent or salt charge to the osmotic agent port and sealing closed the osmotic agent port;
(c) adding salt water to the salt water inlet port; and
(d) collecting potable water from the water outlet port.

Preferably, the housing assembly is essentially cylindrical in shape and the forward osmosis assembly and reverse osmosis element are both in a spiral wound configuration. Preferably, the osmotic agent or salt charge is selected from the group consisting of brine, urine, sodium chloride, potassium chloride, dehydrate sea salt, an inorganic salt, and combinations thereof. Preferably, the salt water source is sea water or brackish water.

Further, the present invention provides a process for generating hydraulic pressure without an external energy input, comprising:
(a) providing a device for generating hydraulic pressure, comprising:
  (i) a housing assembly having a FO end and a hydraulic pressure output end, a sealable osmotic agent access port communicating with the FO end of the housing assembly, a hydraulic fluid inlet port and a hydraulic fluid pressure outlet port;
  (ii) a forward osmosis assembly contained within the housing assembly at the FO end, wherein the forward osmosis assembly further comprises a central hollowed unit wherein the hollow communicates with the hydraulic fluid water inlet port; and
  (iii) a piston or baffle assembly located between the forward osmosis assembly and the hydraulic fluid outlet port within the housing assembly and movable between the FO end and the hydraulic fluid outlet port of the housing assembly;

(b) adding osmotic agent or salt charge to the osmotic agent port and sealing closed the osmotic agent port;

(c) adding hydraulic fluid to the hydraulic fluid inlet port; and (d) applying hydraulic pressure generated out of the hydraulic fluid pressure outlet port.

Preferably, the housing assembly is essentially cylindrical in shape and the forward osmosis assembly is in a spiral wound configuration. Preferably, the osmotic agent or salt charge is selected from the group consisting of brine, urine, sodium chloride, potassium chloride, dehydrate sea salt, an inorganic salt, and combinations thereof.

Further, the present invention provides a device for generating hydraulic pressure without an external energy input, comprising:

(a) a housing assembly having a FO end and a hydraulic pressure output end, a sealable osmotic agent access port communicating with the FO end of the housing assembly, a hydraulic fluid inlet port and a hydraulic fluid pressure outlet port;

(b) a forward osmosis assembly contained within the housing assembly at the FO end, wherein the forward osmosis assembly further comprises a central hollowed unit wherein the hollow communicates with the hydraulic fluid water inlet port; and (c) a piston or baffle assembly located between the forward osmosis assembly and the hydraulic fluid outlet port within the housing assembly and movable between the FO end and the hydraulic fluid outlet port of the housing assembly.

Preferably, the housing assembly is essentially cylindrical in shape and the forward osmosis assembly is in a spiral wound configuration. Preferably, the osmotic agent or salt charge is selected from the group consisting of brine, urine, sodium chloride, potassium chloride, dehydrate sea salt, an inorganic salt, and combinations thereof.

BRIEF DESCRIPTION OF THE DRAWINGS

FIG. 1 shows the inventive device in a cut away view showing a spiral wound FO membrane element, a spiral wound RO membrane element, the movable piston or baffle, and three access ports of the housing assembly.

DETAILED DESCRIPTION OF THE INVENTION

The present invention provides a device for using hydraulic pressure generated through forward osmosis (FO) to drive the energy requirements of a reverse osmosis (RO) device or simply for the hydraulic energy pressure generated. The device may generate drinkable water from salt water without an energy input simply by using the hydraulic energy generated by the FO device to drive the RO device. In addition, the potable water generated by the inventive device is of better purity than potable water generated by similar RO devices for desalination driven by external energy sources because the salt water is double filtered, first by the FO element and then by the RO element.

In a preferred embodiment, the inventive device is best used in an emergency situation where external energy sources may not be available. One such example is the inclusion of the inventive device in a life raft to provide drinkable water to passengers stranded in such a raft after a disaster at sea. The advantage of such a device is that it is relatively small and light weight, has few or no moving parts and does not need external energy. Moreover, one risk for passengers in a life raft for extended periods before rescue is dehydration.

The inventive FO-RO device operates by a forward osmosis element pressurizing a vessel and that pressure drives a desalination of sea water in a reverse osmosis (RO) element. In order to start the process, a charge of salt (osmotic agent) is needed. The salt can be in the form of a concentrated brine solution (salt solution in a saturated concentration) or even granules of dried salt or even other osmotically active molecules such as sugars. The osmotic agent is provided to the OA fill plug (FIG. 1) when the FO element is empty of all liquids (dry).

Figure 1:
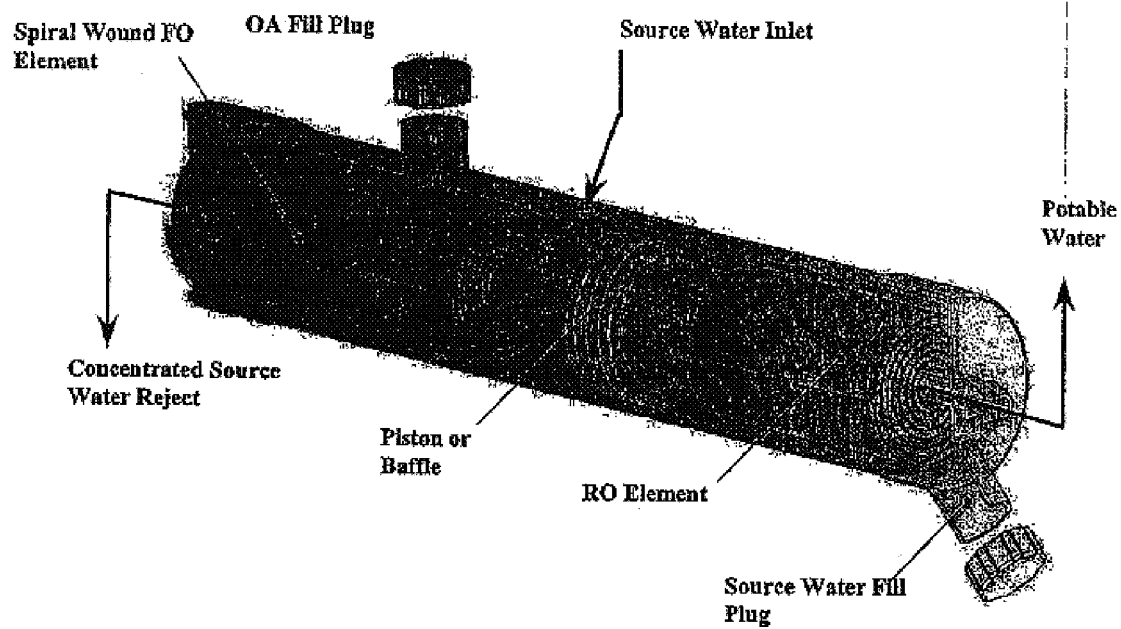
FIG. 1 shows a diagram of the inventive device having a reverse osmosis element. Specifically.
Figure 2:
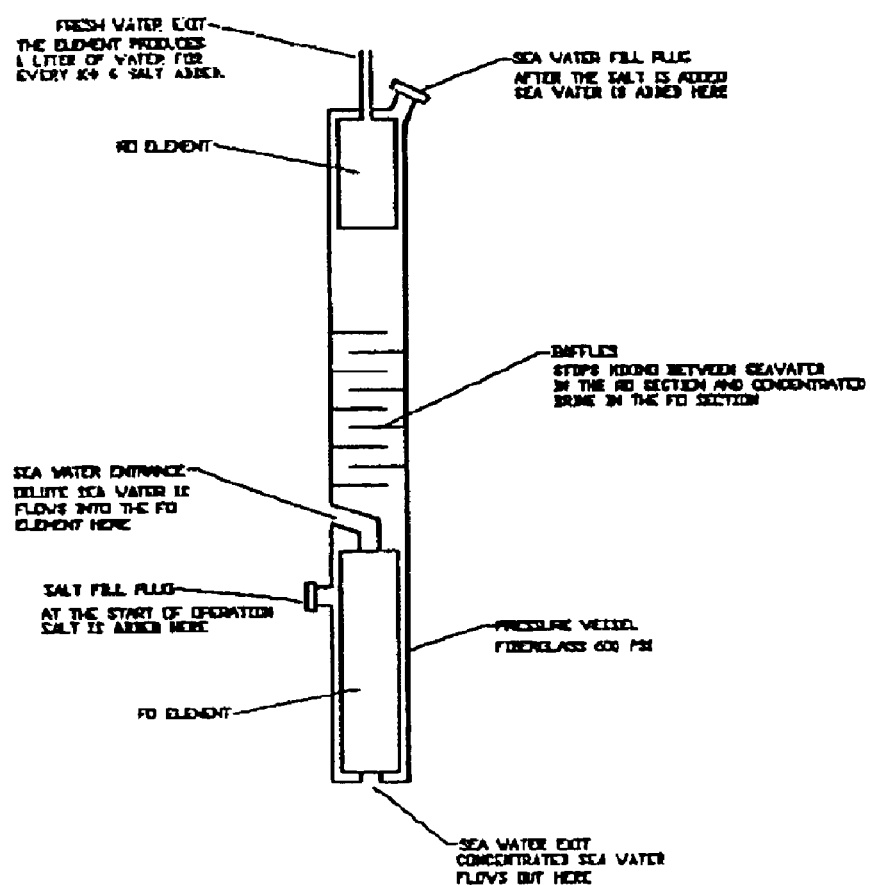
FIG. 2 shows a schematic of the inventive device having baffles instead of a moveable piston.

The inventive device is then held vertically with the source salt water or hydraulic fluid inlet held upward. The device is immersed in the ocean (salt water or hydraulic fluid source) allowing the salt water to enter the inverted vessel through the source water (or hydraulic fluid) inlet port until the FO side of the housing assembly is filled with liquid (FIG. 1).

At this time, since the osmotic agent in the OA port was dry, dissolving salt (or brine) located toward the middle of the housing assembly will become more dilute with the addition of the salt water or hydraulic fluid. Water will be osmotically pulled through the membrane of the FO element from the source side toward the chamber side or middle of the housing assembly. This will cause an increase in hydraulic pressure within the housing assembly that can only exit away from the FO element and toward an outlet port (if the device is used for generating hydraulic pressure) or toward the RO assembly to generate hydraulic pressure to drive the RO process. Quickly, pressure can rise to well above 30 bar, the pressure needed to separate water from salt water, and fresh water will begin to pass out of the RO element. The pressure will rise to the point where the flow of water pulled from the salt water in the FO side equals fresh water production out of the outlet at the RO side.

The process will run until the osmotic agent (salt granules) is all dissolved and the FO element no longer pulls fresh water from salt water or no longer generates hydraulic pressure with the pulled hydraulic fluid. At that time, the inventive device is pulled from the salt water pool or hydraulic fluid (e.g., ocean), drained and a new charge of osmotic agent added to start the process again.

An important consideration in the design of the inventive device is to keep the concentration of sea water on the source side of the FO element as low as possible and to keep the concentration of brine or osmotic agent on the chamber side of the RO element as low as possible. This lowers the hydraulic pressure delivered and increases the production of water for a given amount of osmotic agent provided.

Figure 4:
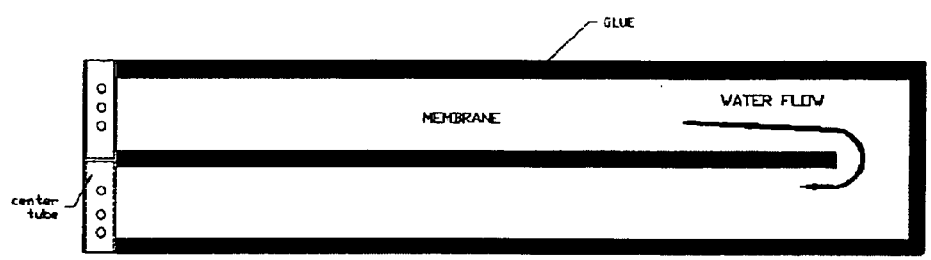
FIG. 4 shows an unwound membrane sandwich of the FO membrane element. A plug in the center tube (around which is wound the membrane sandwich in a spiral wound configuration) and a glue line running down the center of the FO element causes source water flowing through the FO element to spiral to the outside of the FO element and then back again toward the center. This flow causes the source side of the FO element to flush out the salt water (or hydraulic fluid) that is being concentrated by water transfer.

The concentration of sea water in the source side of the FO element is kept low by inducing a density driven flow through the vessel/housing assembly and FO assembly/element. The FO element is preferably a spiral wound element with the source water on the interior of the membrane envelope. A plug in a center tube (if spiral wound) and a glue line running down the center of the membrane sandwich causes source water flowing through the FO element to spiral to the outside of the element and then back again to the center (FIG. 4). A drawing of the unrolled FO element showing this membrane sandwich is shown in FIG. 4. The flow causes the source side of the FO element to flush out the salt water that is being concentrated by water transfer into the chamber. A flushing flow is induced by an increasing density of the source water as it becomes concentrated. The orientation of the FO element causes the heavy, concentrated source water to fall out the bottom of the element and be replaced by ambient sea or salt water entering through the source water or hydraulic fluid inlet port.

The concentration of water on the chamber side of the RO element is also flushed from the membrane surface by a density-driven flow originating at the FO element. The RO element is preferably a spiral wound element with the sea water of salt water on the outside of the membrane envelope. As water is forced through the membrane from the hydraulic pressure generated by the FO element, the sea water or salt water is concentrated and its increased density causes it to fall out the bottom of the RO element and be replaced by less concentrated sea water or salt water rising around the outside of the RO element driven from the FO element.

The piston or baffle element is preferably installed in order to prevent mixing between the FO chamber and the RO chamber located within the housing device. A baffle would work because the density gradients in the device tend to keep the respective chambers from having their fluid mix.

The construction of the inventive device housing chamber is steel (preferably stainless steel) or fiberglass. Rigid plastics that can withstand the pressures can also be used. One embodiment of the inventive device has a 4 inch diameter housing assembly, 30 inches long with a 3 inch diameter by 12 inch diameter FO element and a 3 inch diameter by 4 inch diameter RO element, wherein both the FO and RO elements are in a spiral wound configuration. Such a device will produce 1 liter of potable water from sea water in less than an hour with a 100 g charge of salt (sodium chloride). The salt is preferably selected from the group consisting of sodium chloride, dehydrated sea salt, any inorganic salt mixture, and combinations thereof.

Figure 3:
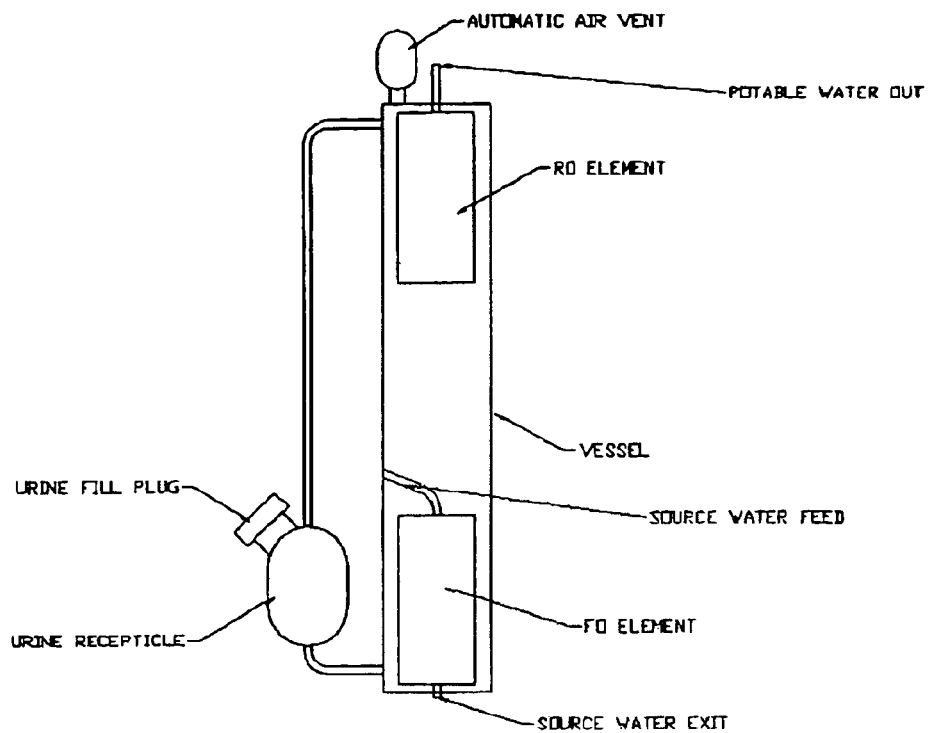
FIG. 3 shows a schematic of an embodiment of the inventive device for extracting potable water from a questionable water source using urine as the osmotic agent (if urine is the only available osmotic source).

In another embodiment of the inventive process, one can extract potable water from a questionable water source using urine as the osmotic agent, preferably if urine is the only available source. FIG. 3 shows a drawing of such a urine-charged device. Referring to FIG. 3, the urine receptacle is filled with urine (or another salt solution available) with the orientation shown. This also immerse the FO element with the urine or other osmotic agent. The device is then placed into the questionable water source in a vertical orientation so that the FO water inlet source tube is underwater but the air vent is above water and the device is left to operate without energy input. The urine in the FO element, due to its osmotic potential, will pull water into the housing unit, gradually filling it. Due to a relatively small communication tube, the urine chamber will remain at single strength during this phase and the air in the vessel will exit through the air vent.

Once the device is filled, the concentration of fluid in the vessel will be less than 10% of the original urine concentration. Once the fluid level is above a communication line between the urine chamber and the top of the vessel, density will cause the urine to settle into the FO element. This concentrated urine will then have enough osmotic potential to force water from the dilute urine at the top of the FO element, through the RO membrane and be collected as potable water.

Membranes

The FO membrane is preferably made from a thin film composite RO membrane. Such membrane composites include, for example, a cellulose ester membrane cast by an immersion precipitation process on a porous support fabric such as woven or nonwoven nylon, polyester or polypropylene, or preferably, a cellulose ester membrane cast on a hydrophilic support such as cotton or paper. The RO membrane is rolled using a commercial thin film composite, sea water desalination membrane, such as Fluid Systems TFC 2822SS.

The membranes used in the inventive device for the FO element (in any configuration) are hydrophilic, cellulose-ester based membranes with salt rejections in the 80% to 95% range when tested as a reverse osmosis membrane (60 psi, 500 PPM NaCl, 10% recovery, 25° C.). Preferably, the membranes are asymmetric and are formed by an immersion precipitation process. The membranes are either unbacked, or have a very open backing that does not impede water reaching the rejection layer, or are hydrophilic and easily wick water to the membrane.

The membrane used in the spiral wound FO element embodiment is preferably a hydrophilic, cellulose-based membrane cast by the immersion precipitation process. The nominal molecular weight cut-off of the membrane is 100 daltons.

FO elements are preferably made from a casted membrane made from a hydrophilic membrane material, for example, cellulose acetate, cellulose proprianate, cellulose butyrate, cellulose diacetate, blends of cellulosic materials, polyurethane, polyamides. Preferably the membranes are asymmetric, that is the membrane has a thin rejection layer on the order of 10 microns thick and a porous sublayer up to 300 microns thick. For mechanical strength they are in one embodiment cast upon a hydrophobic porous sheet backing, wherein the porous sheet is either woven or non-woven but having at least about 30% open area. Preferably, the woven backing sheet is a polyester screen having a total thickness of about 65 microns (polyester screen) and total asymmetric membrane is 165 microns in thickness. Preferably, the asymmetric membrane was caste by an immersion precipitation process by casting the cellulose material onto the polyester screen. In a preferred embodiment, the polyester screen was 65 microns thick, 55% open area.

Osmotic Agent

Osmotic agents are generally inorganic salt based or sugar-based. A preferred osmotic agent was Sodium chloride=6.21 wt %, Potassium chloride=7.92 wt %, Trisodium citrate=10.41 wt %, Glucose=58.24 wt %, and Fructose=17.22 wt %. Other osmotic agents (or hydration formulations) include, for example, medicines within a dextrose formulation, dehydrated foods, and any other solute that can be hydrated with water.

A sugar-based osmotic agent can be powders or syrups made from the following: fructose, sucrose, glucose, sodium citrate, potassium citrate, citric acid, potassium ascorbate, sodium ascorbate, ascorbic acid, water soluble vitamins, sodium chloride, and potassium chloride. For example, a mixture of 60% fructose, 10% potassium citrate, 10% sodium citrate and 20% water was tested in the 30 cm element and had performance similar to 80% fructose —20% water nutrient syrup.

The preferred osmotic agents that are nutrients include, for example, fructose, glucose, sucrose, sodium citrate, potassium citrate, sodium ascorbate, potassium ascorbate, and other watersoluble vitamins.

What is claimed is:

1. A device for desalinating water to produce drinking water, comprising:
   (a) a closed housing assembly having a FO end and a RO end, a sealable osmotic agent access port communicating with the FO end of the housing assembly, a salt water inlet port and a water outlet port;
   (b) a forward osmosis membrane element contained within the housing assembly at the FO end, wherein a central hollowed element communicates with the water outlet port;
   (c) a reverse osmosis membrane element having a central hollowed element communicating with the water outlet port, and
   (d) a movable piston or baffle assembly located between the FO end and the RO end of the housing assembly, whereby the piston or baffle acts to transmit hydraulic pressure generated by the FO element.

2. The device for desalinating water to produce drinking water of claim 1 wherein the housing assembly is cylindrical.

3. The device for desalinating water to produce drinking water of claim 1 wherein the forward osmosis membrane element is either in a plate and frame configuration or in a spiral wound configuration.

4. The device for desalinating water to produce drinking water of claim 1 wherein the reverse osmosis membrane element is in a spiral wound configuration.

5. The device for desalinating water to produce drinking water of claim 1 wherein the FO element membrane is a membrane selected from the group consisting of a thin film composite RO membrane, a cellulose ester membrane, and an asymmetric cellulose ester membrane having a porous woven or non-woven support backing.

6. The device for desalinating water to produce drinking water of claim 5 wherein the asymmetric cellulose ester membrane is backed with a woven or non-woven nylon or polyester or polypropylene fabric material.

7. A process to produce potable water from a salt water source, comprising:
   (a) providing a device for desalinating salt water to produce potable water comprising:
      (i) a housing assembly having a FO end and a RO end, a sealable osmotic agent access port communicating with the FO end of the housing assembly, a salt water inlet port and a water outlet port;
      (ii) a forward osmosis assembly contained within the housing assembly at the FO end, wherein the forward osmosis assembly further comprises a central hollowed unit wherein the hollow communicates with the salt water inlet port;
      (iii) a reverse osmosis element having a central hollow device assembly, wherein the hollow chamber communicates with the water outlet port; and
      (iv) a piston or baffle assembly located between the forward osmosis assembly and the reverse osmosis element within the housing assembly to transmit hydraulic pressure between the FO end and the RO end of the housing assembly;
   (b) adding osmotic agent or salt charge to the osmotic agent port and sealing closed the osmotic agent port;
   (c) adding salt water to the salt water inlet port; and
   (d) collecting potable water from the water outlet port.

8. The process to produce potable water from a salt water source of claim 7 wherein the housing assembly is essentially cylindrical in shape and the forward osmosis assembly and reverse osmosis element are both in a spiral wound configuration.

9. The process to produce potable water from a salt water source of claim 7 wherein the osmotic agent or salt charge is selected from the group consisting of brine, urine, sodium chloride, potassium chloride, dehydrate sea salt, an inorganic salt, and combinations thereof.

10. The process to produce potable water from a salt water source of claim 7 wherein the salt water source is sea water or brackish water.

11. The process to produce potable water from a salt water source of claim 7 wherein the FO element membrane is a membrane selected from the group consisting of a thin film composite RO membrane, a cellulose ester membrane, and an asymmetric cellulose ester membrane having a porous woven or non-woven support backing.

12. The process to produce potable water from a salt water source of claim 11 wherein the asymmetric cellulose ester membrane is backed with a woven or non-woven nylon or polyester or polypropylene fabric material.

* * * * *